C. TIPTON.
BOXING AND BEARING.
APPLICATION FILED MAR. 6, 1917.

1,239,543.

Patented Sept. 11, 1917.

Inventor
Clay Tipton

By

Attorney

UNITED STATES PATENT OFFICE.

CLAY TIPTON, OF MENARD, TEXAS.

BOXING AND BEARING.

1,239,543.  Specification of Letters Patent.  Patented Sept. 11, 1917.

Application filed March 6, 1917. Serial No. 152,736.

*To all whom it may concern:*

Be it known that I, CLAY TIPTON, a citizen of the United States, residing at Menard, in the county of Menard and State of Texas, have invented certain new and useful Improvements in Boxings and Bearings, of which the following is a specification.

This invention relates to a combined sectional boxing and bearing rings for motor shafts in engines and mills.

The object of the invention is to do away with the usual Babbitt and brass bearings and to substitute therefor rings which are locked to the boxing, and which may be easily removed and replaced on opening said boxing.

The invention consists of the novel features of construction hereinafter described, pointed out in the claims and shown in the accompanying drawings, in which:—

Figure 1:
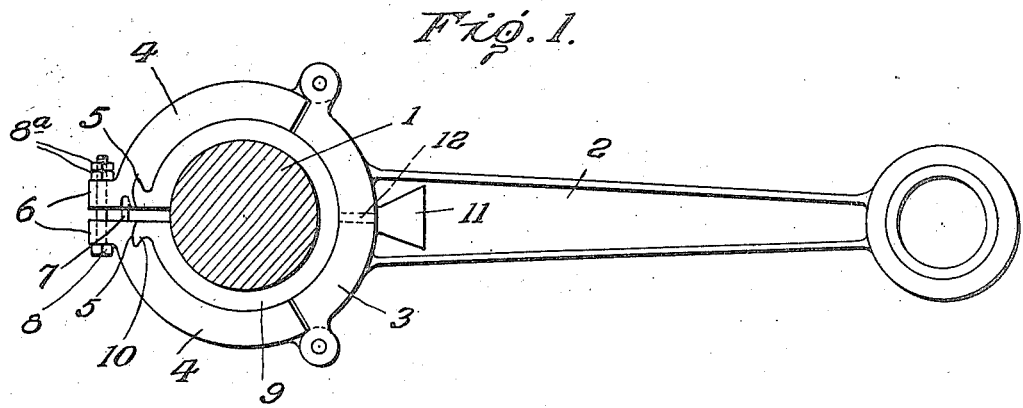
Figure 1 is a side elevation of the complete device, the shaft being in section.

In the drawings 1 represents a shaft and 2 a connecting rod. To the shaft end of the rod is fixed a section 3 of my boxing, which may or may not be integral with the rod. To said section 3 are hinged sections 4. Adjacent their free ends these sections are interiorly recessed as at 5.

The ends are provided with outwardly extending lips 6 and on the inner face of one of the lips are two dowels 7 which, when the sections 4 are in closed position enter suitable recesses in the other lip.

The sections are locked in closed position by bolts 8 which pass through the lips 6 and carry nuts 8ª.

These lips are slightly spaced apart when the sections are in locked position.

Figure 2:
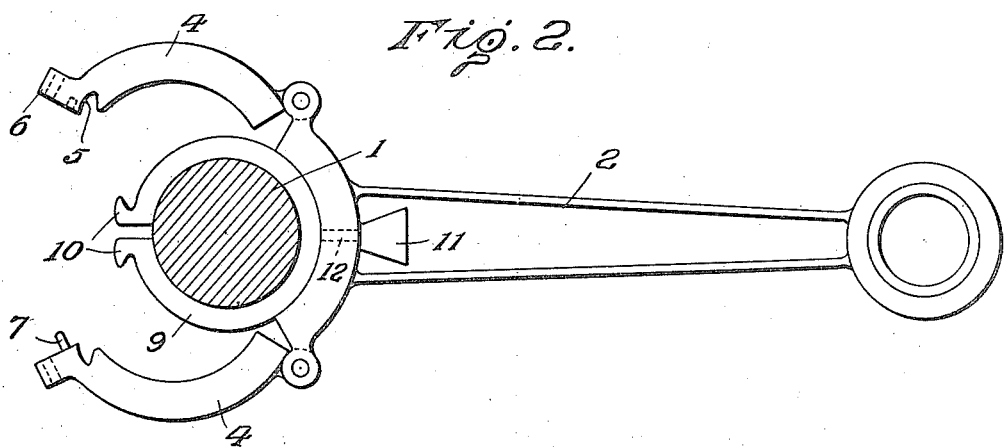
Fig. 2 is a similar view, the boxing being open.
Figure 3:
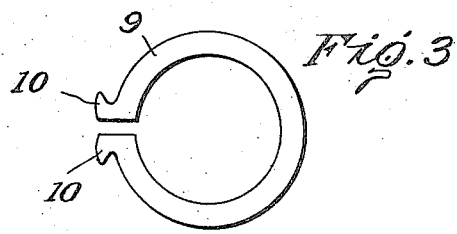
Fig. 3 is a detail view of one of the rings.
Figure 4:
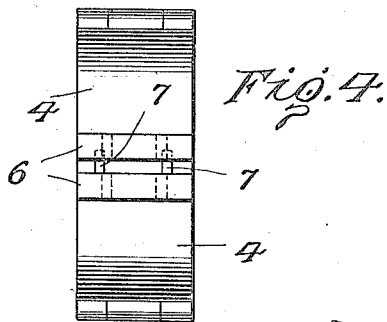
Fig. 4 is a front elevation of one of the boxes.

The rings 9 may be of any desired number and width. They are cut rings and at their free ends carry outwardly extending curved lips 10. The rings are slipped on the shaft with the boxing in open position, as in Fig. 2, and when the boxing is closed the lips 10 of the rings enter the recesses 5 of the sections 4, thereby locking the rings and boxing together. When first turned out the rings may be slightly flattened on their inner faces, and when the nuts 8ª are screwed down the closing of the sections 4 will compress the rings on the shaft 1, thus forming a perfect bearing for said shaft. The connecting rod carries an oil cup 11 which feeds oil to the shaft through a bore 12 in the boxing section 3.

It will be obvious that any worn ring may be quickly removed and a new one slipped in place.

What I claim is:—

1. A bearing of the kind described comprising a fixed section of a boxing, hinged sections carried thereby, said hinged sections having recesses adjacent their free ends, and outwardly projecting lips, bolts working through said lips for holding the sections in closed position, and a cut bearing ring adapted to fit within the boxing and having outwardly extending lips adapted to be received in the recesses of the boxing.

2. The combination with a connecting rod, of a bearing box section carried thereby, hinged sections carried by the first mentioned sections, means for locking the hinged sections in closed position, said hinged sections being recessed adjacent their free ends, and a bearing ring adapted to fit a shaft and to fit within said boxing, said ring being cut and having at its ends outwardly curving lips adapted to be received in the recesses of the boxing as the hinged sections swing into closed position.

In testimony whereof I affix my signature in the presence of two witnesses.

CLAY TIPTON.

Witnesses:
 JOE P. FLACK,
 WM. J. CALLAN.

*Copies of this patent may be obtained for five cents each, by addressing the "Commissioner of Patents, Washington, D. C."*